Nov. 8, 1932. G. R. ESPING 1,886,660
CONDUIT HOLDER
Filed March 5, 1930 2 Sheets-Sheet 2

INVENTOR.
BY Gustave R. Esping
Hull Brock & West
ATTORNEY.

Patented Nov. 8, 1932

1,886,660

UNITED STATES PATENT OFFICE

GUSTAVE R. ESPING, OF CLEVELAND, OHIO

CONDUIT HOLDER

Application filed March 5, 1930. Serial No. 433,249.

This invention relates to a method and an apparatus for use in connection with rigid conduit electric wiring.

The principal object is to produce a method and device which will result in increased speed and efficiency in wiring and reduce the labor consequent thereto.

A further object is to provide a conduit holding mechanism adapted to be used in connection with a standard outlet box and permanently secured therein. A further object is the provision of such a holding means which shall function as a lock washer after its utility in the wiring process has passed.

Other and more specific objects will appear as the description proceeds.

Figure 3:
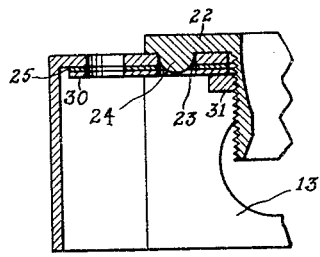
Figure 5:
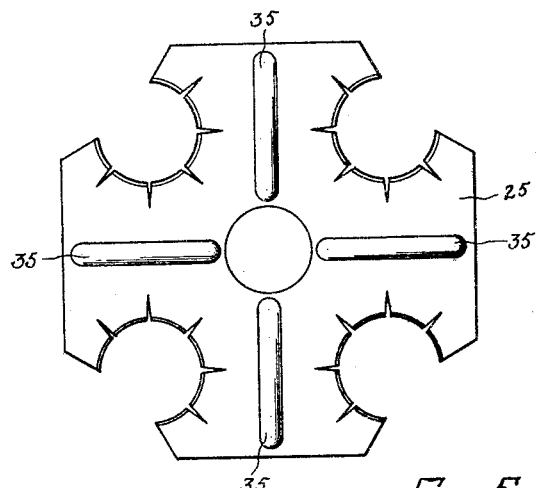
Figure 4:
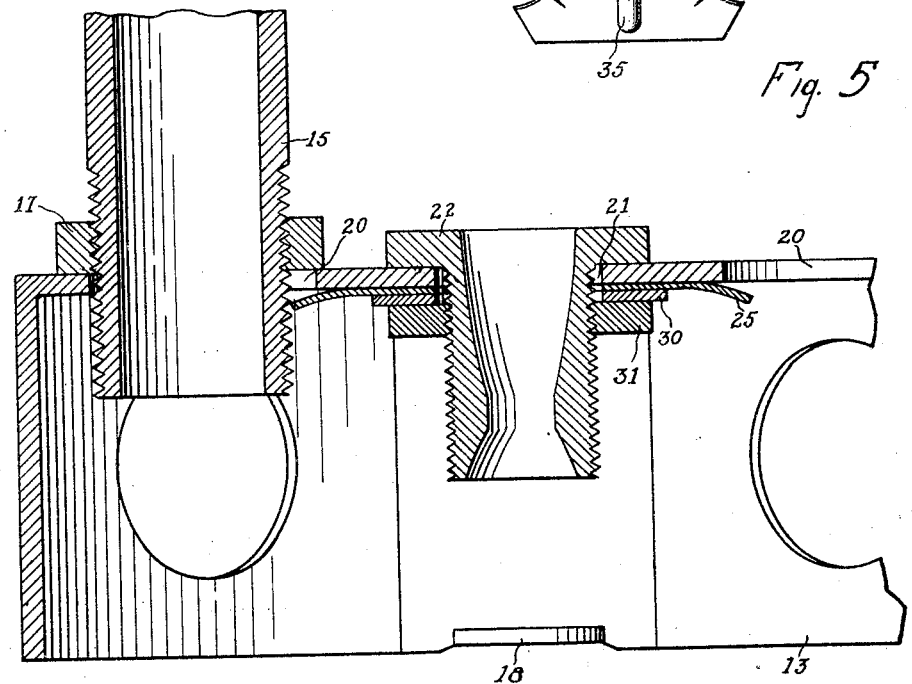

Referring to the accompanying drawings, Fig. 1 is a side elevational view showing one situation in which my improved device is useful; Fig. 2 is a bottom plan view showing my improved pipe holding means in position in a standard outlet box; Fig. 3 is a fragmentary sectional view corresponding to a portion of a section on line 3—3 of Fig. 2; Fig. 4 is an enlarged fragmentary sectional view corresponding substantially to a portion of the section on line 4—4 of Fig. 2 and Fig. 5 is a detail view of a modified form of holding device.

In Fig. 1 I have shown schematically a form comprising boards 10, 11 and 12 into which concrete is to be poured in formation of a ceiling beam. The outlet box 13 is shown as being positioned with its open face downward resting upon the board 10. Extending into the upper face of the outlet box are conduits 14 and 15 held in position by lock nuts 16 and 17 respectively.

The outlet box 13 is of the standard octagonal construction provided with clips 18 for securing the face plate thereto and having openings 20 for the reception of pipes such as 14 and 15. The face in which the openings 20 are provided also has a central opening 21 which receives an anchoring stud 22, and smaller holes 23 for the reception of bosses 24 carried by the said stud. A plate 25 made of thin resilient metal has a central opening adapted to receive stud 22 for anchoring it in position. This plate is provided with a number of openings, four being shown, defined by inwardly extending spring fingers 26 which are of such a size as to grip the threads of the pipe 15 thrust through the opening 20 and through the openings defined by the said spring fingers. A reinforcing spider 30 (best seen in Fig. 2) may be received also on the stud 22 between the outlet box and the nut 31 for the purpose of reinforcing the plate 25 and holding the spring fingers 26 in proper position.

As best seen in Fig. 4, when the pipe 15 is thrust through the opening 20, the spring fingers engage the threads thereof, yielding to pressure tending to thrust the pipe into the outlet box and resisting return pressure by reason of the tendency of the fingers to have their effective length increased by being straightened in an attempt to withdraw the pipe.

In the modification of Fig. 5, I have shown a form in which the plate 25, provided with the openings defined by spring fingers, as in the other modification, has ribs 35 integral therewith, which may be formed by pressing, to eliminate the member 30.

A very important feature of the process involved in the use of my improved construction is the placing of the lock nut on Nov. 8, 1932.   C. FIELD   1,886,665
MULTIPLE UNIT ELECTRIC DRIVE SYSTEM
Original Filed June 18, 1927   4 Sheets-Sheet 1
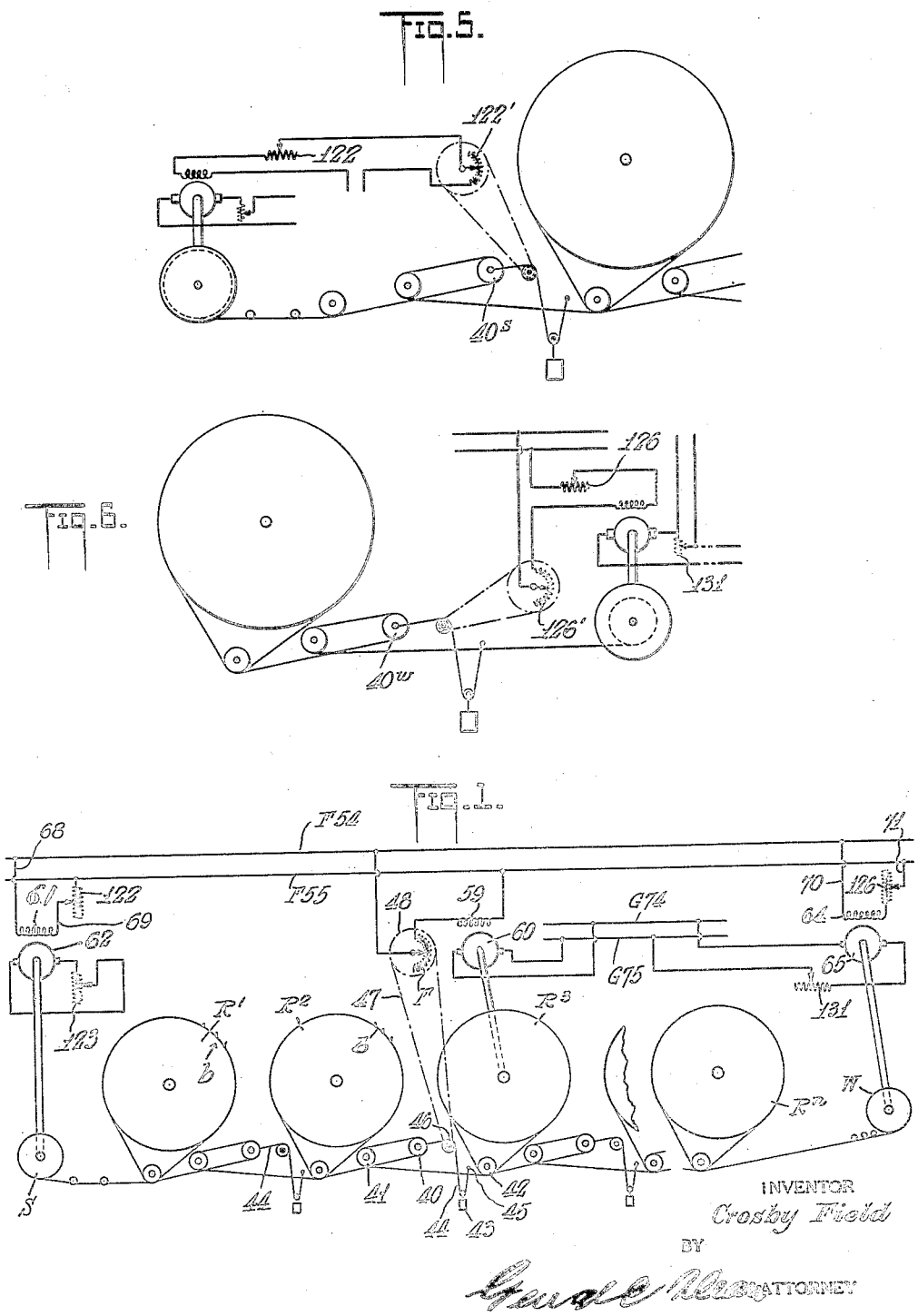

In using my improved construction, in the illustrative example of Fig. 1, the outlet box 13 having the plate 25 in position therein is filled with paper or the like and attached to board 10. The conduits are then inserted simply by thrusting the threaded ends thereof through the openings and are firmly anchored in position by tightening the lock nuts 16, 17. This construction serves to hold the conduits very firmly in their proper position, while the concrete is poured into the form indicated by boards 10, 11 and 12. After the concrete sets, and the form is removed, it is only necessary to remove the paper from the outlet box, screw on the lock nut on the inside of the outlet box to hold the same in permanently fixed position. After the inside lock nut is placed in position, the spring fingers 26 and the plate 25 of which they form a part, act as a lock washer to prevent loosening of the nut.